US012223192B2

(12) United States Patent
Clift et al.

(10) Patent No.: US 12,223,192 B2
(45) Date of Patent: Feb. 11, 2025

(54) METHOD FOR SIGNALING MEMORY REQUIREMENTS IN ATSC3.0 WHEN OUT-OF-ORDER DATA IS BEING UTILIZED

(71) Applicant: Sony Group Corporation, Tokyo (JP)

(72) Inventors: Graham Clift, San Diego, CA (US); Luke Fay, San Diego, CA (US)

(*) Notice: Subject to any disclaimer, the term of this patent is extended or adjusted under 35 U.S.C. 154(b) by 59 days.

(21) Appl. No.: 18/186,808

(22) Filed: Mar. 20, 2023

(65) Prior Publication Data

US 2024/0281164 A1 Aug. 22, 2024

Related U.S. Application Data

(60) Provisional application No. 63/486,286, filed on Feb. 22, 2023.

(51) Int. Cl.
G06F 3/06 (2006.01)

(52) U.S. Cl.
CPC ............ G06F 3/0644 (2013.01); G06F 3/064 (2013.01); G06F 3/0604 (2013.01); G06F 3/0679 (2013.01)

(58) Field of Classification Search
None
See application file for complete search history.

(56) References Cited

U.S. PATENT DOCUMENTS

| | | | |
|---|---|---|---|
| 7,474,703 B2* | 1/2009 | Choi | H04L 1/006 375/241 |
| 9,426,479 B2* | 8/2016 | Shaffer | H04N 21/2362 |
| 2010/0223533 A1* | 9/2010 | Stockhammer | H03M 13/3761 714/776 |
| 2011/0216841 A1* | 9/2011 | Luby | H03M 13/3761 375/260 |
| 2018/0048854 A1 | 2/2018 | Kwak et al. | |
| 2020/0145715 A1* | 5/2020 | Okada | H04N 21/64322 |
| 2020/0169765 A1* | 5/2020 | Clift | H04N 21/44004 |
| 2023/0337156 A1* | 10/2023 | Simon | H04W 56/001 |

FOREIGN PATENT DOCUMENTS

WO 2019227475 A1 12/2019

OTHER PUBLICATIONS

S. M. Weiss, "Reception considerations for distributed transmission in ATSC systems," 2005 Digest of Technical Papers. International Conference on Consumer Electronics, 2005. ICCE., Las Vegas, NV, USA, 2005, pp. 477-478, (Year: 2005).*

ATSC Organization, "ATSC Standard: Signaling, Delivery, Synchronization, and Error Protection", ATSC, Advanced Television Systems Committee, Feb. 16, 2023, A/331:Feb. 2023, Washington, D.C. USA.

(Continued)

Primary Examiner — Daniel F. McMahon
(74) Attorney, Agent, or Firm — John L. Rogitz; John M. Rogitz

(57) ABSTRACT

Techniques are described for expanding and/or improving the Advanced Television Systems Committee (ATSC) 3.0 television protocol in robustly delivering the next generation broadcast television services. To improve robustness for datacast files to limited memory platforms, each file is divided into partitions and then the packets in a partition are arranged out of order (OOO), with the partitions then being sent in order with their respective packets OOO.

20 Claims, 8 Drawing Sheets

(56) References Cited

OTHER PUBLICATIONS

ATSC Organization, "ATSC Standard: Signaling, Delivery, Synchronization, and Error Protection", ATSC, Advanced Television Systems Committee, Oct. 4, 2023, A/331:Oct. 2023, Washington, D.C., USA.
Hayajneh Khaled et al, "Overlapped Fountain Coding for Delay-Constrained Priority-Based Broadcast Applications", 2015 IEEE 14th Canadian Workshop on Information Theory (CWIT), Jul. 6, 2015, pp. 79-82.
John W Byers et al, "A Digital Fountain Retrospective", Computer Communication Review, ACM SIGCOMM, Nov. 8, 2019, ages 82-85, vol. 49, No. 5, New York, NY, US.
"ATSC Standard: Signaling, Delivery, Synchronization, and Error Protection", ATSC, Mar. 31, 2022, Doc. A/331:2022-0331 Mar. 2022.
ATSC Organization: "A/331 :2021—ATSC Candidate Standard: Revision of A/331 :2021, Signaling, Delivery, Synchronization, and Error Protection, with Amendments No. 1, 2, and 3, Jan. 19, Jul. 26, 2021, Amendment No. 1 approved Apr. 22, 2021, Amendment No. 2 approved May 27, 2021", ATSC, Advanced Television Systems Committee, XP017862160.
ATSC Organization: "A/331 :2023—Signaling, Delivery, Synchronization, and Error Protection", ATSC, Advanced Television Systems Committee, 1776 K Street N.W., Washington, D.C. 20006, USA Oct. 4, 2023 (Oct. 4, 2023), XP017866360.

* cited by examiner

METHOD FOR SIGNALING MEMORY REQUIREMENTS IN ATSC3.0 WHEN OUT-OF-ORDER DATA IS BEING UTILIZED

FIELD

This application relates to technical advances necessarily rooted in computer technology and directed to digital television, and more particularly to Advanced Television Systems Committee (ATSC) 3.0.

BACKGROUND

The Advanced Television Systems Committee (ATSC) 3.0 suite of standards is a set of over a dozen industry technical standards as indicated in A/300 for delivering the next generation of broadcast television. ATSC 3.0 supports delivery of a wide range of television services including televised video, interactive services, non-real time delivery of data, and tailored advertising to a large number of receiving devices, from ultra-high-definition televisions to wireless telephones. ATSC 3.0 also orchestrates coordination between broadcast content (referred to as "over the air") and related broadband delivered content and services (referred to as "over the top"). ATSC 3.0 is designed to be flexible so that as technology evolves, advances can be readily incorporated without requiring a complete overhaul of any related technical standard.

As understood herein, ATSC 3.0 can be used to deliver data to mobile receivers, such as delivering maps or operating manuals to moving vehicles. For file delivery, as further understood herein, any packet loss results in corruption. Present principles introduce error correction techniques to improve data reception for all files including video media.

SUMMARY

As also understood herein, application layer forward error correction (AL-FEC) in ATSC3 is specified in the ATSC standard A/331 to use the error correction technique described in publication RFC 6330 ("RaptorQ"). To account for the possibility of file delivery under conditions in which reception is temporarily blocked, such as when a mobile receiver passes through a tunnel or in other regions of echo or dropout, to improve robustness all packets of a transmitted file can be sent out of order (OOO), or sections of the file can be spread apart in time. In this way, during the period of blockage, the losses are limited to small sections of the file where fewer repair bits can correct the missing or corrupt packets.

However, as recognized herein, sending packets OOO across the entire file means there is no knowledge of where in memory the next packet is located. Non-contiguous data is often stored in non-persistent memory such as RAM because saving individual packets to persistent memory (such as FLASH) at random access locations is often too slow for typical data reception rates offered by ATSC 3.0. This means that OOO packet delivery without repair requires non-persistent memory up to the file length, which may not be plausible for some receivers (with limited storage capacity). Furthermore, source data that can be repaired requires that intermediate symbols be generated which are additionally stored in non-persistent memory. Performing fountain code-based repair (RAPTOR-Q) is CPU intensive requiring timely processing of source data and repair data collectively and persistent memory such as FLASH would exacerbate the length of time for repair.

Accordingly, present principles recognize the advantage of first breaking up a data file into partitions and then for each partition randomly order the packets OOO. With partitioning of OOO packet delivery, knowing that a contiguous block (partition) of the data is being delivered OOO at any one time reduces the non-persistent memory requirements. The memory requirement should still be sufficient to contain two partitions, one for current data being received and the second to concurrently move previously received data to persistent memory to free up memory for the next partition. Thus for example, repair of data in the non-persistent memory requires two partitions plus repair data (e.g., 2×percent repair). In the case of 10% repair, the memory requirement becomes 2.two times the size of the partition. In the case that the receiver generates intermediate symbols for repair as source symbols are received then this memory requirement becomes four times the partition.

Ideally a receiver will also retain the partial data for a partition that was incomplete due to reception beginning in the middle of the partition. This example places the non-persistent memory requirement at three partitions plus repair data, or six times if intermediate symbols are being generated, so that on a second file carousel the first received partition can be filled in with the missing data. In any case, the total RAM memory could be far smaller than the size that would be needed to store the entire file sent with packets OOO. The time needed by the receiver to move data from non-persistent memory to persistent memory and, if needed to repair the data can be estimated based on the bit rate and partition size.

In a first aspect, in digital television, a method includes dividing at least one file into plural partitions. The method includes, within each partition, arranging packets of the partition out of order (OOO), and sending the resulting partitions in order with their respective packets OOO to at least one receiver.

In some embodiments the method can include interleaving plural source blocks of the file with repair symbols, with each partition including plural source blocks.

In example implementations that include repair the file has Z source blocks, wherein Z is greater than or equal to an integer ceiling of F/T divided by $k_{max}$, wherein $k_{max}$ represents the number of symbols in each source block, T is the number of bytes in each symbol, and F is the size of the file. At least some partitions include Z1 source blocks, wherein Z1 equals the ceiling of Z divided by $P_n$, wherein $P_n$ is the total number of partitions. On the other hand, at least one partition can include $Z_s$ source blocks, wherein $Z_s$ equals a floor of Z divided by $P_n$. Ceiling means round up to the nearest integer and floor means round down to the nearest integer.

In another aspect, a digital television apparatus includes at least one receiver configured to receive digital television from a digital television transmitter system. The receiver in turn includes at least one processor programmed with instructions for receiving into non-persistent memory at least some of plural partitions of at least one file, each partition comprising packets out of order (OOO). The instructions are executable for ordering the packets into correct order, sending at least one partition in non-persistent memory to persistent memory, and receiving into the non-persistent memory additional partitions.

In another aspect, a digital television apparatus includes at least one transmitter that in turn includes at least one processor programmed with instructions to configure the processor for dividing at least one file into plural partitions, and within each partition, arranging packets of the partition out of order (OOO). The instructions are executable for sending the partitions in order with their respective packets OOO to at least one receiver.

The details of the present application, both as to its structure and operation, can best be understood in reference to the accompanying drawings, in which like reference numerals refer to like parts, and in which:

DETAILED DESCRIPTION

Figure 1:
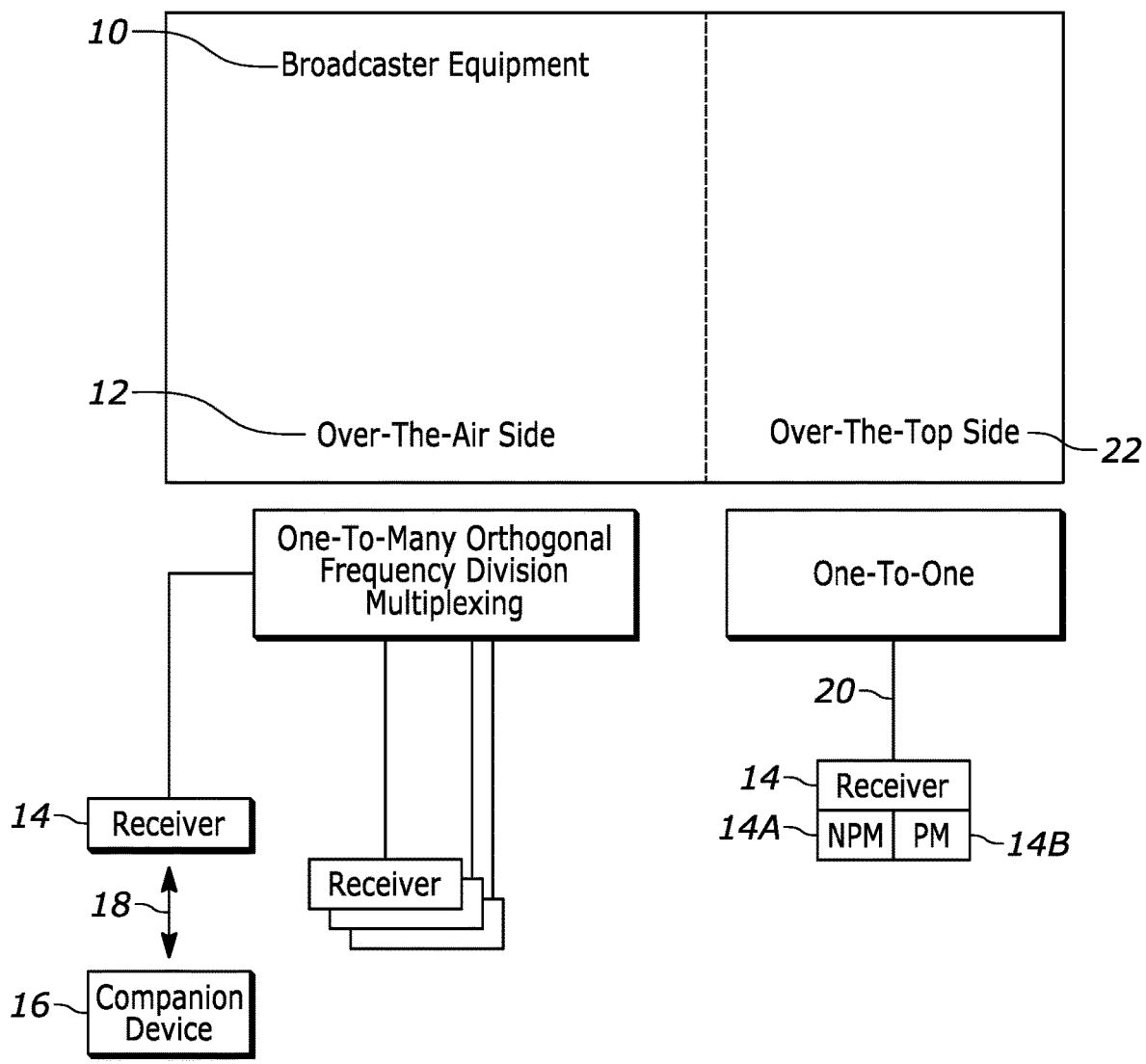
FIG. 1 illustrates an Advanced Television Systems Committee (ATSC) 3.0 system.

This disclosure relates to technical advances in digital television such as in Advanced Television Systems Committee (ATSC) 3.0 television. An example system herein may include ATSC 3.0 source components and client components, connected via broadcast and/or over a network such that data may be exchanged between the client and ATSC 3.0 source components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google, such as Android®. These operating environments may be used to execute one or more browsing programs, such as a browser made by Microsoft or Google or Mozilla or other browser program that can access websites hosted by the Internet servers discussed below.

ATSC 3.0 publication A/331, Annex A, incorporated herein by reference, may be particularly relevant to techniques described herein.

ATSC 3.0 source components may include broadcast transmission components and servers and/or gateways that may include one or more processors executing instructions that configure the source components to broadcast data and/or to transmit data over a network such as the Internet. A client component and/or a local ATSC 3.0 source component may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be a single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to hypertext markup language (HTML)-5, Java®/Javascript, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"An [element] having at least one of A, B, and C" (likewise "having at least one of A, B, or C" and "having at least one of A, B, C") includes A alone, B alone, C alone, A and B together, A and C together, B and C together, and/or A, B, and C together, etc.

Turning to FIG. 1, an example of an ATSC 3.0 source component is labeled "broadcaster equipment" 10 and may include over-the-air (OTA) equipment 12 for wirelessly broadcasting, typically via orthogonal frequency division multiplexing (OFDM) in a one-to-many relationship, television data to plural receivers 14 such as ATSC 3.0 televisions. A receiver 14 may have both non-persistent memory 14A such as certain types of solid state RAM and persistent memory 14B such as flash. One or more receivers 14 may communicate with one or more companion devices 16 such as remote controls, tablet computers, mobile telephones, and the like over a short range, typically wireless link 18 that may be implemented by Bluetooth®, low energy Bluetooth, other near field communication (NFC) protocol, infrared (IR), etc.

Also, one or more of the receivers 14 may communicate, via a wired and/or wireless network link 20 such as the Internet, with over-the-top (OTT) equipment 22 of the broadcaster equipment 10 typically in a one-to-one relationship. The OTA equipment 12 may be co-located with the OTT equipment 22 or the two sides 12, 22 of the broadcaster equipment 10 may be remote from each other and may communicate with each other through appropriate means. In any case, a receiver 14 may receive ATSC 3.0 television signals OTA over a tuned-to ATSC 3.0 television channel and may also receive related content, including television, OTT (broadband). Note that computerized devices described in all of the figures herein may include some or all of the components set forth for various devices in FIGS. 1 and 2.

Figure 2:
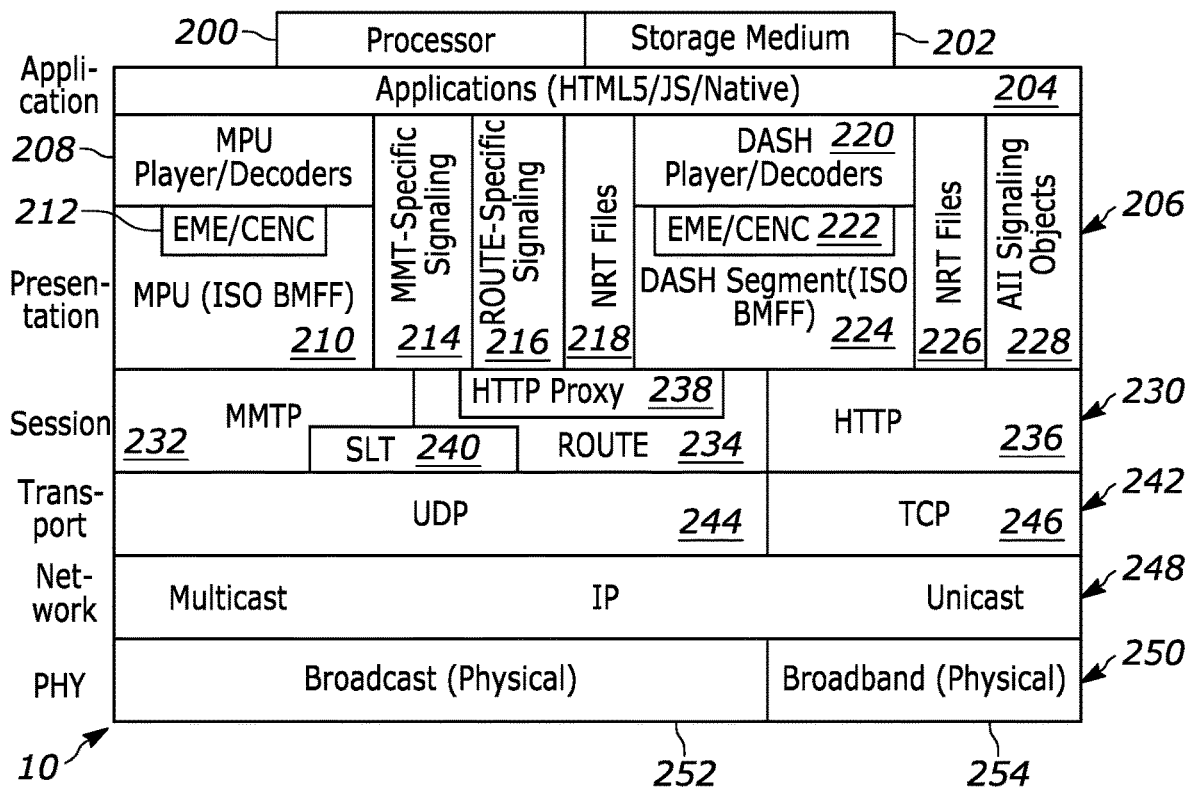
FIG. 2 illustrates components of the devices shown in FIG. 1.
Figure 2:
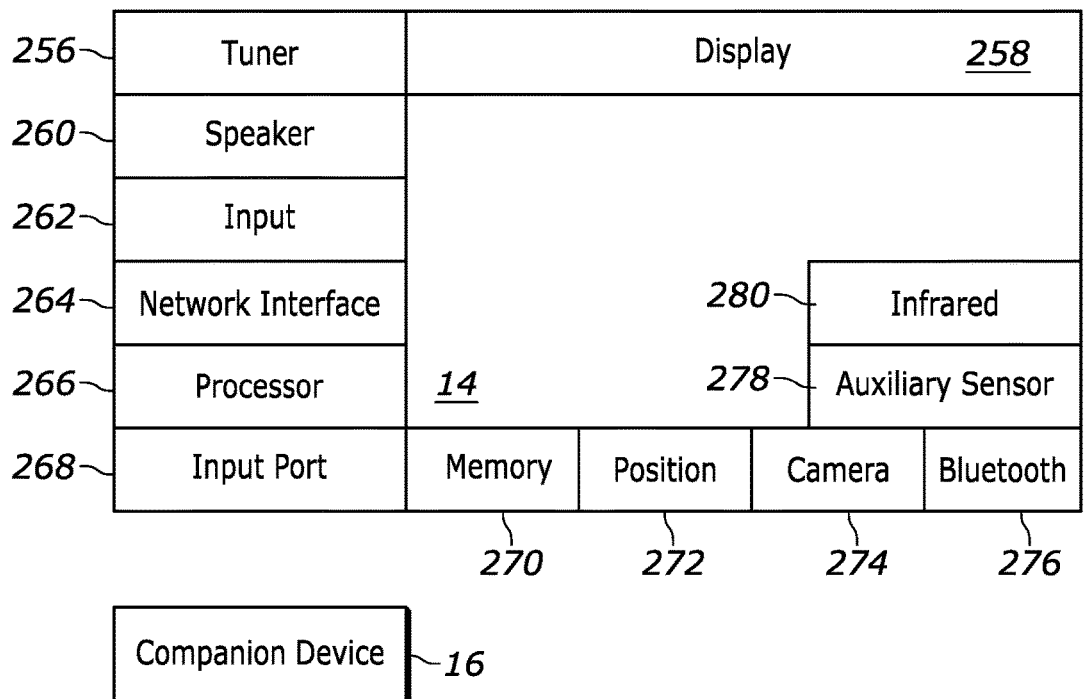

Referring now to FIG. 2, details of examples of components shown in FIG. 1 may be seen. FIG. 2 illustrates an example protocol stack that may be implemented by a combination of hardware and software. Using the ATSC 3.0 protocol stack shown in FIG. 2 and modified as appropriate for the broadcaster side, broadcasters can send hybrid service delivery in which one or more program elements are delivered via a computer network (referred to herein as "broadband" and "over-the-top" (OTT)) as well as via a wireless broadcast (referred to herein as "broadcast" and "over-the-air" (OTA)). FIG. 2 also illustrates an example stack with hardware that may be embodied by a receiver.

Disclosing FIG. 2 in terms of broadcaster equipment 10, one or more processors 200 accessing one or more computer storage media 202 such as any memories or storages described herein may be implemented to provide one or more software applications in a top-level application layer 204. The application layer 204 can include one or more software applications written in, e.g., HTML5/Javascript running in a runtime environment. Without limitation, the applications in the application stack 204 may include linear TV applications, interactive service applications, companion screen applications, personalization applications, emergency alert applications, and usage reporting applications. The applications typically are embodied in software that represents the elements that the viewer experiences, including video coding, audio coding and the run-time environment. As an example, an application may be provided that enables a user to control dialog, use alternate audio tracks, control audio parameters such as normalization and dynamic range, and so on.

Below the application layer 204 is a presentation layer 206. The presentation layer 206 includes, on the broadcast (OTA) side, broadcast audio-video playback devices referred to as Media Processing Units (MPU) 208 that, when implemented in a receiver, decode and playback, on one or more displays and speakers, wirelessly broadcast audio video content. The MPU 208 is configured to present International Organization for Standardization (ISO) base media file format (BMFF) data representations 210 and video in high efficiency video coding (HEVC) with audio in, e.g., Dolby audio compression (AC-4) format. ISO BMFF is a general file structure for time-based media files broken into "segments" and presentation metadata. Each of the files is essentially a collection of nested objects each with a type and a length. To facilitate decryption, the MPU 208 may access a broadcast side encrypted media extension (EME)/common encryption (CENC) module 212.

FIG. 2 further illustrates that on the broadcast side the presentation layer 206 may include signaling modules, including either motion pictures expert group (MPEG) media transport protocol (MMTP) signaling module 214 or real-time object delivery over unidirectional transport (ROUTE) signaling module 216 for delivering non-real time (NRT) content 218 that is accessible to the application layer 204. NRT content may include but is not limited to stored replacement advertisements.

On the broadband (OTT or computer network) side, when implemented by a receiver the presentation layer 206 can include one or more dynamic adaptive streaming over hypertext transfer protocol (HTTP) (DASH) player/decoders 220 for decoding and playing audio-video content from the Internet. To this end the DASH player 220 may access a broadband side EME/CENC module 222. The DASH content may be provided as DASH segments 224 in ISO/BMFF format.

As was the case for the broadcast side, the broadband side of the presentation layer 206 may include NRT content in files 226 and may also include signaling objects 228 for providing play back signaling.

Below the presentation layer 206 in the protocol stack is a session layer 230. The session layer 230 includes, on the broadcast side, either MMTP protocol 232 or ROUTE protocol 234. Note that the ATSC standard provides an option to use MPEG MMT for transport, though it is not shown here.

On the broadband side the session layer 230 includes HTTP protocol 236 which may be implemented as HTTP-secure (HTTP(S)). The broadcast side of the session layer 230 also may employ a HTTP proxy module 238 and a service list table (SLT) 240. The SLT 240 includes a table of signaling information which is used to build a basic service listing and provide bootstrap discovery of the broadcast content. Media presentation descriptions (MPD) are included in the "ROUTE Signaling" tables delivered over user datagram protocol (UDP) by the ROUTE transport protocol.

A transport layer 242 is below the session layer 230 in the protocol stack for establishing low-latency and loss-tolerating connections. On the broadcast side the transport layer 242 uses (UDP 244 and on the broadband side transmission control protocol (TCP) 246.

The example non-limiting protocol stack shown in FIG. 2 also includes a network layer 248 below the transport layer 242. The network layer 248 uses Internet protocol (IP) on both sides for IP packet communication, with multicast delivery being typical on the broadcast side and unicast being typical on the broadband side.

Below the network layer 248 is the physical layer 250 which includes broadcast transmission/receive equipment 252 and computer network interface(s) 254 for communicating on the respective physical media associated with the two sides. The physical layer 250 converts Internet Protocol (IP) packets to be suitable to be transported over the relevant medium and may add forward error correction functionality to enable error correction at the receiver as well as contain modulation and demodulation modules to incorporate modulation and demodulation functionalities. This converts bits into symbols for long distance transmission as well as to increase bandwidth efficiency. On the OTA side the physical layer 250 typically includes a wireless broadcast transmitter to broadcast data wirelessly using orthogonal frequency division multiplexing (OFDM) while on the OTT side the physical layer 250 includes computer transmission components to send data over the Internet.

A DASH Industry Forum (DASH-IF) profile sent through the various protocols (HTTP/TCP/IP) in the protocol stack may be used on the broadband side. Media files in the DASH-IF profile based on the ISO BMFF may be used as the delivery, media encapsulation and synchronization format for both broadcast and broadband delivery.

Each receiver 14 typically includes a protocol stack that is complementary to that of the broadcaster equipment.

A receiver 14 in FIG. 1 may include, as shown in FIG. 2, an Internet-enabled TV with an ATSC 3.0 TV tuner (equivalently, set top box controlling a TV) 256. The receiver 14 may be an Android®-based system. The receiver 14 alternatively may be implemented by a computerized Internet enabled ("smart") telephone, a tablet computer, a notebook computer, a wearable computerized device, and so on. Regardless, it is to be understood that the receiver 14 and/or other computers described herein is configured to undertake present principles (e.g. communicate with other devices to undertake present principles, execute the logic described herein, and perform any other functions and/or operations described herein).

Accordingly, to undertake such principles the receiver 14 can be established by some or all of the components shown in FIG. 1. For example, the receiver 14 can include one or more displays 258 that may be implemented by a high definition or ultra-high definition "4K" or higher flat screen and that may or may not be touch-enabled for receiving user input signals via touches on the display. The receiver 14 may also include one or more speakers 260 for outputting audio in accordance with present principles, and at least one additional input device 262 such as, e.g., an audio receiver/microphone for, e.g., entering audible commands to the receiver 14 to control the receiver 14. The example receiver 14 may further include one or more network interfaces 264 for communication over at least one network such as the Internet, a WAN, a LAN, a PAN etc. under control of one or more processors 266. Thus, the interface 264 may be, without limitation, a Wi-Fi transceiver, which is an example of a wireless computer network interface, such as but not limited to a mesh network transceiver. The interface 264 may be, without limitation, a Bluetooth® transceiver, Zigbee® transceiver, Infrared Data Association (IrDA) transceiver, Wireless USB transceiver, wired USB, wired LAN, Powerline or Multimedia over Coax Alliance (MoCA). It is to be understood that the processor 266 controls the receiver 14 to undertake present principles, including the other elements of the receiver 14 described herein such as, for instance, controlling the display 258 to present images thereon and receiving input therefrom. Furthermore, note the network interface 264 may be, e.g., a wired or wireless modem or router, or other appropriate interface such as, e.g., a wireless telephony transceiver, or Wi-Fi transceiver as mentioned above, etc.

In addition to the foregoing, the receiver 14 may also include one or more input ports 268 such as a high definition multimedia interface (HDMI) port or a USB port to physically connect (using a wired connection) to another CE device and/or a headphone port to connect headphones to the receiver 14 for presentation of audio from the receiver 14 to a user through the headphones. For example, the input port 268 may be connected via wire or wirelessly to a cable or satellite source of audio video content. Thus, the source may be a separate or integrated set top box, or a satellite receiver. Or, the source may be a game console or disk player.

The receiver 14 may further include one or more computer memories 270 such as disk-based or solid-state storage that are not transitory signals, in some cases embodied in the chassis of the receiver as standalone devices or as a personal video recording device (PVR) or video disk player either internal or external to the chassis of the receiver for playing back audio video (AV) programs or as removable memory media. Also, in some embodiments, the receiver 14 can include a position or location receiver 272 such as but not limited to a cellphone receiver, global positioning satellite (GPS) receiver, and/or altimeter that is configured to e.g. receive geographic position information from at least one satellite or cellphone tower and provide the information to the processor 266 and/or determine an altitude at which the receiver 14 is disposed in conjunction with the processor 266. However, it is to be understood that that another suitable position receiver other than a cellphone receiver, GPS receiver and/or altimeter may be used in accordance with present principles to determine the location of the receiver 14 in e.g. all three dimensions.

Continuing the description of the receiver 14, in some embodiments the receiver 14 may include one or more cameras 274 that may include one or more of a thermal imaging camera, a digital camera such as a webcam, and/or a camera integrated into the receiver 14 and controllable by the processor 266 to gather pictures/images and/or video in accordance with present principles. Also included on the receiver 14 may be a Bluetooth® transceiver 276 or other Near Field Communication (NFC) element for communication with other devices using Bluetooth® and/or NFC technology, respectively. An example NFC element can be a radio frequency identification (RFID) element.

Further still, the receiver 14 may include one or more auxiliary sensors 278 (such as a motion sensor such as an accelerometer, gyroscope, cyclometer, or a magnetic sensor and combinations thereof), an infrared (IR) sensor for receiving IR commands from a remote control, an optical sensor, a speed and/or cadence sensor, a gesture sensor (for sensing gesture commands) and so on providing input to the processor 266. An IR sensor 280 may be provided to receive commands from a wireless remote control. A battery (not shown) may be provided for powering the receiver 14.

The companion device 16 may incorporate some or all of the elements shown in relation to the receiver 14 described above.

The methods described herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Figure 3:
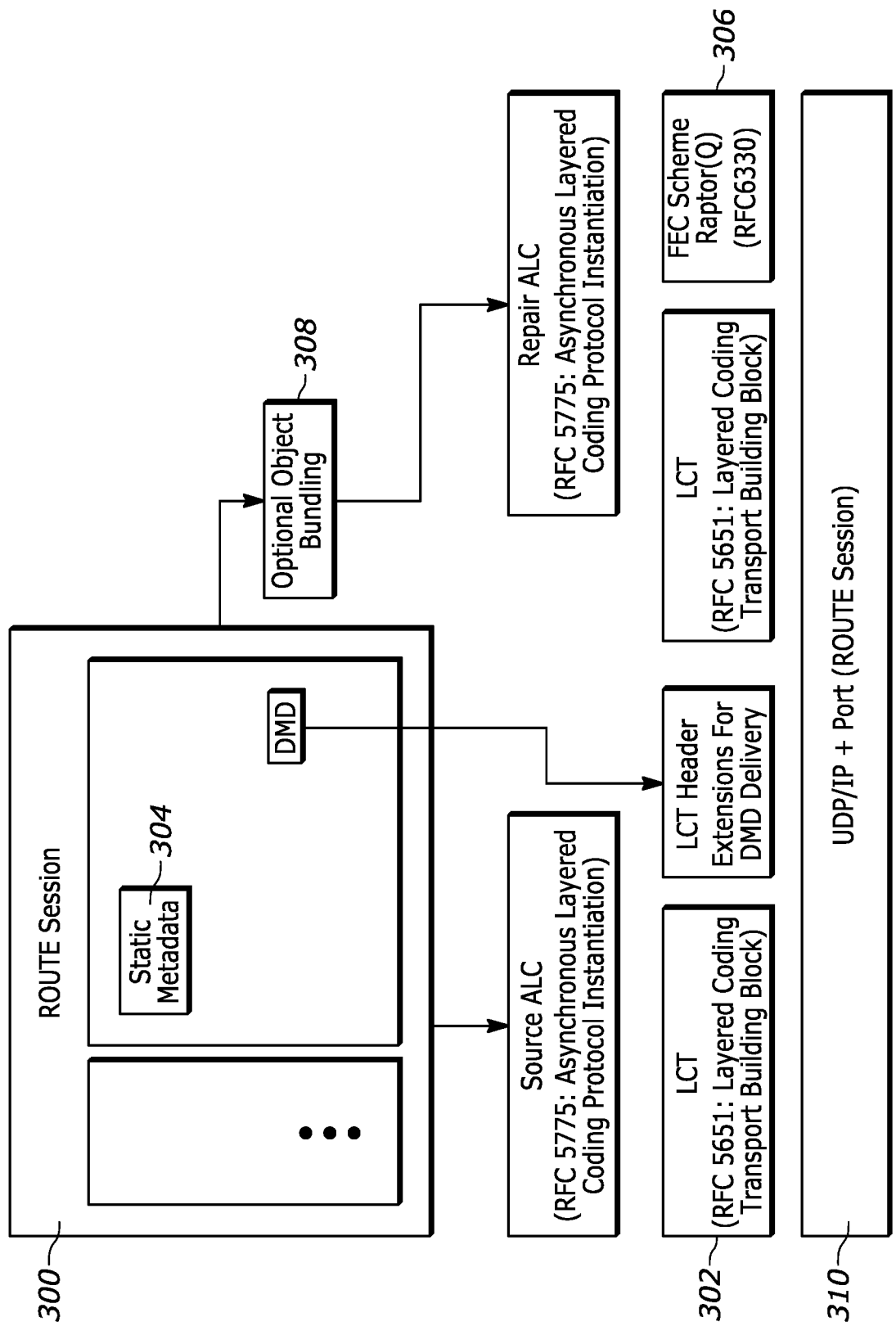
FIG. 3 illustrates an example transmitter side architecture.

Now referring to FIG. 3, a ROUTE session 300 is established at an ATSC 3.0 transmitter that delivers layered coding transport (LCT) packets 302. These packets may carry source objects or FEC repair data. From a top-down approach, a source protocol consists of one or more LCT channels, each carrying delivery objects and, optionally, object metadata 304. The metadata may be statically delivered in signaling metadata or may be dynamically delivered, either as a compound object in the entity mode or as LCT extension headers in packet headers. The packets are carried in ROUTE using a specific FEC scheme 306 that permits flexible fragmentation of the object at arbitrary byte boundaries. In addition, delivery objects may be FEC protected, either individually or in bundles 308. In either case, the bundled object is encoded and the repair symbols are delivered via a ROUTE session over UDP/IP 310. By themselves, or in combination with any received source packets, the received repair symbols permit the recovery of delivery object bundles. Note that one or more repair flows may be generated, each with different characteristics, for example to support different latency requirements, different protection requirements, etc.

Figures 4, 5:
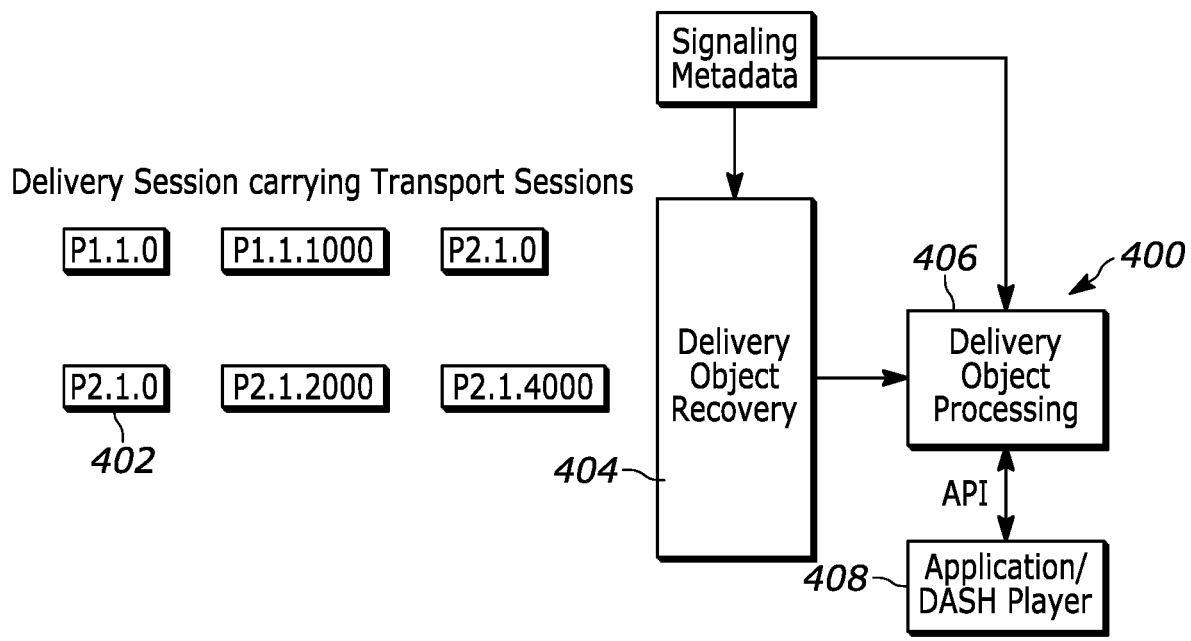
FIG. 4 illustrates an example receiver side architecture.
FIG. 5 illustrates schematic partitions sent in order, with their internal packets arranged out of order (OOO)

FIG. 4 illustrates the basic receiver operation. A receiver 400 such as any appropriately configured receiver herein receives packets 402 and filters those packets accordingly. From the ROUTE session and each contained LCT channel, the receiver regenerates delivery objects 404 from the ROUTE session and each contained LCT channel. The delivery objects are in turn passed to the appropriate handler 406 for further data processing for use by an application or a media player 408.

Refer now to FIG. 5. A file has been divided into plural partitions 500. The first partition P1 represents a first sequence of data in the file, the second partition P2 represents the next succeeding sequence of data in the file, and so on, so that the partitions $P_1, \ldots, P_n$ are arranged for transmission in order as defined by the file.

However, as shown in FIG. 5, the data packets 502 within each partition 500 are not in order, but rather are arranged out-of-order (OOO), e.g., by random distribution of packets within a partition. Thus, for example, packet #8 in the first partition $P_1$ is first, then packet #2, followed by packet #20, followed by packet #3, and so on until all packets within the first partition $P_1$ have been arranged OOO.

Figure 6:
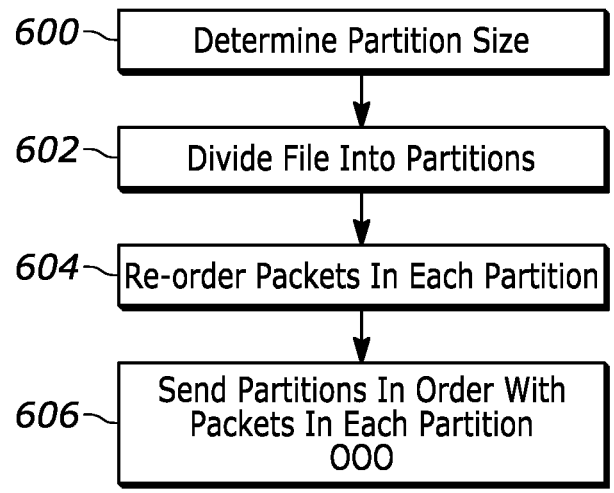
FIG. 6 illustrates example transmitter logic in example flow chart format.

FIG. 6 illustrates transmitter logic consistent with FIG. 5. Commencing at state 600, the number and/or size of partitions to a requested file to be transmitted for instance OTA using ATSC 3.0 techniques is determined. Moving to state 602 the file is divided into the into plural partitions.

Proceeding to state 604, within each partition, the data packets of the partition are arranged (or re-ordered) to be out of order (OOO). In one example, the packets are randomly ordered within the partition to which they belong. Ending at state 606, the partitions are transmitted to one or more receivers in correct partition order but with their respective packets OOO.

Figure 7:
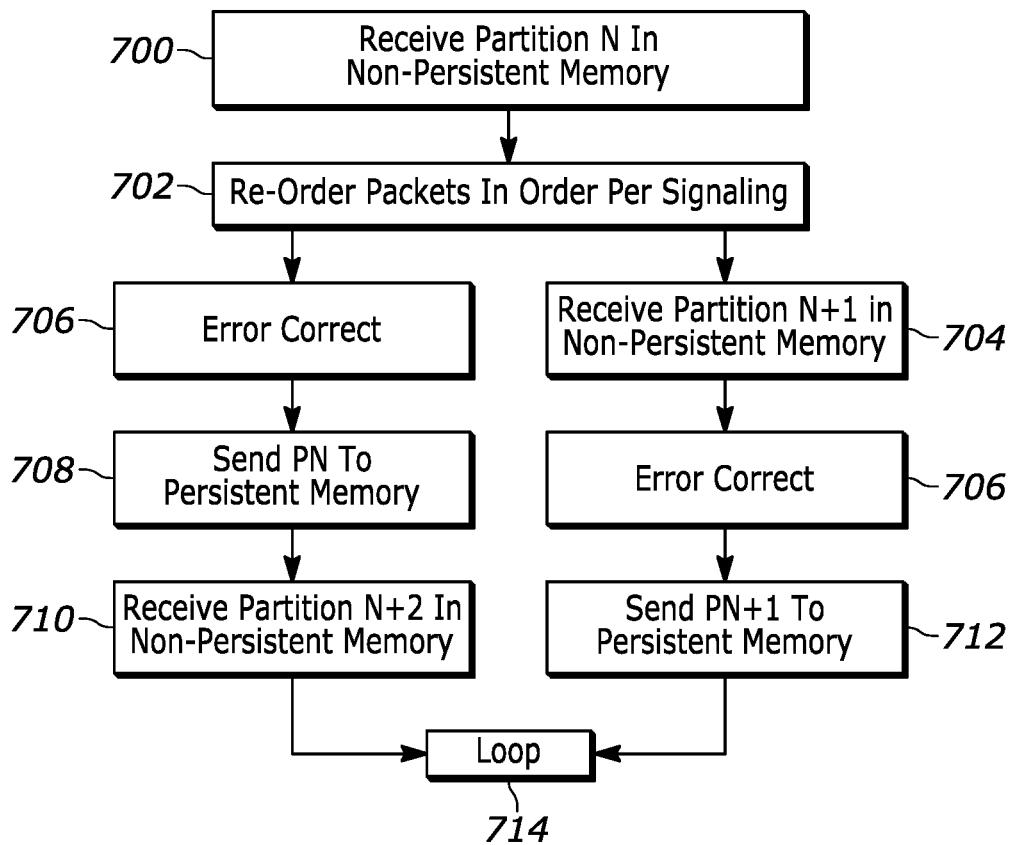
FIG. 7 illustrates example receiver logic in example flow chart format.

FIG. 7 illustrates receiver side logic. Commencing at state 700, the receiver receives the transmitted file first partition first, which is stored in non-persistent memory. At block 702 the packets in the received partition may be re-ordered into correct order using packet information in the ATSC 3.0 signaling. Note that re-ordering may occur later, after the partition has been transferred to persistent memory.

State 704 indicates that the next succeeding partition is received into non-persistent memory. That is, plural partitions may be resident in non-persistent memory at once, although typically not all partitions will reside in non-persistent memory at the same time because as discussed below partitions are offloaded into persistent memory as the file is being received.

States 706 indicate that if desired, errors in packets can be corrected, in the example shown while the partitions still reside in non-persistent memory, although it is to be understood that error correction may occur after the partition has been offloaded to persistent memory at state 708 (for the first partition) and 712 (for the second partition). One or more subsequent partitions of the file are then received into non-persistent memory at state 710 and the process continues this loop 714 of receiving partitions of the file in non-persistent memory, offloading them to persistent memory, and continuing to receive successive partitions into non-persistent memory. Some or all of the file may be displayed or provided for use to another application.

Figure 8:
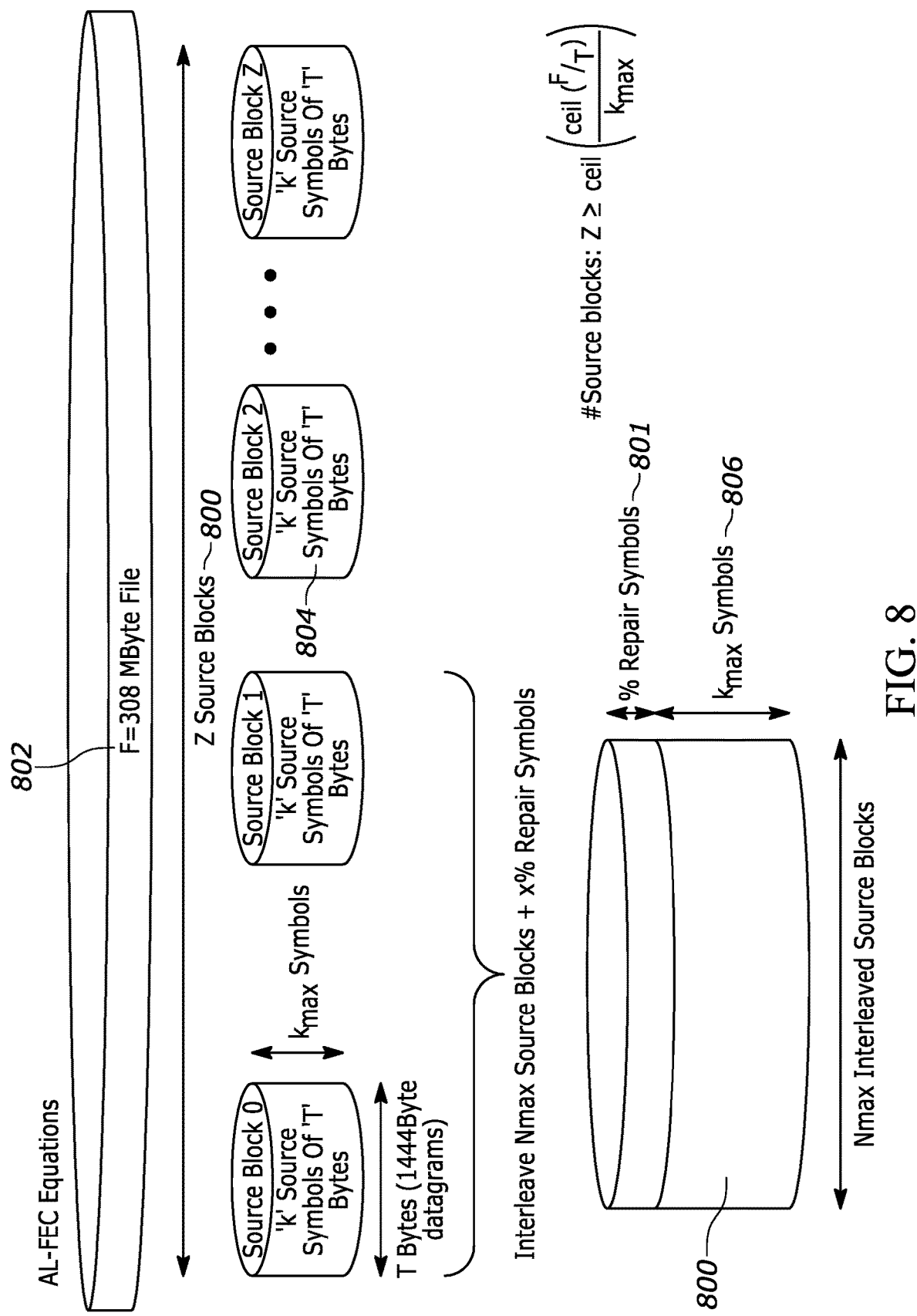
FIG. 8 illustrates source blocks of a file.
Figure 9:
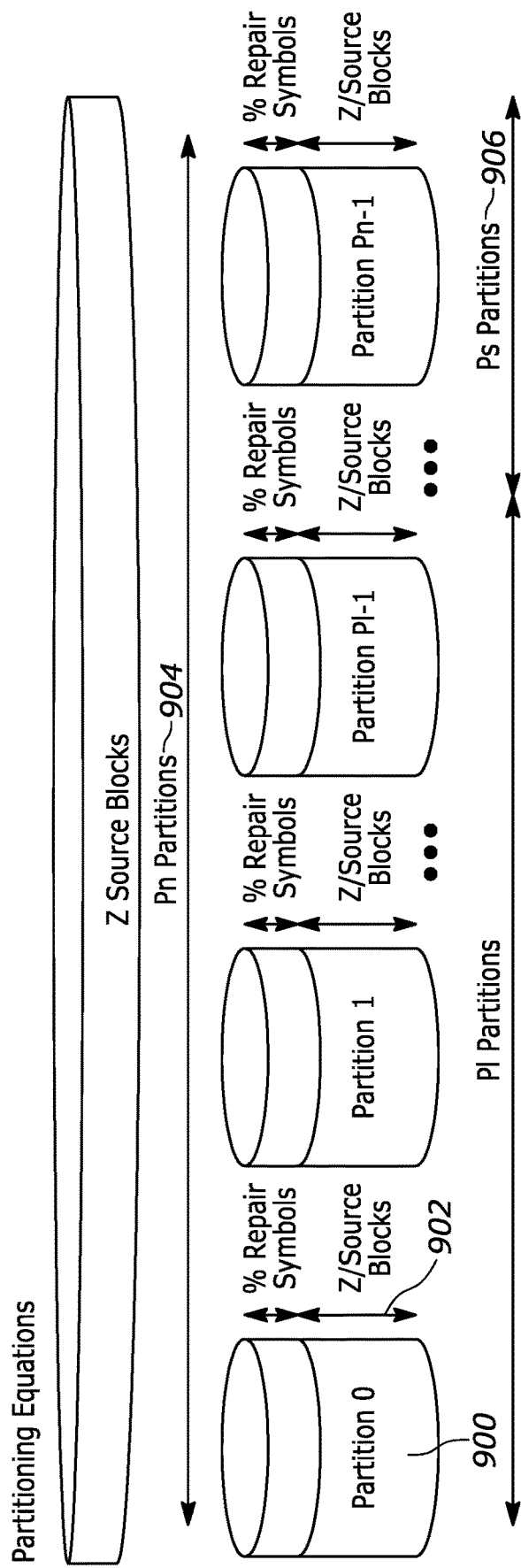
FIG. 9 illustrates partitions containing source blocks of FIG. 8.

Refer now to FIGS. 8 and 9. The partitioning equations discussed herein may be built on top of RaptorQ AL-FEC so that incremental repair can be achieved while the next partition of packets is being received. This involves re-encoding the original AL-FEC OTI parameters (as defined in RFC 6330) to support this partitioning of the source blocks. In this way a receiver can support in RAM the reception and repair of OOO data of very large files, where the limitation of the size of this file is only determined by the available FLASH memory and by the size of the OOO partitions plus any repair data and intermediate symbols needed in RAM to perform RaptorQ repair algorithms.

Plural source blocks 800 of the file are interleaved with repair symbols 801. As will be discussed shortly, each partition includes plural source blocks.

As indicated in FIG. 8, the file includes Z source blocks. As shown in the #Source blocks equation in FIG. 8, Z is greater than or equal to a ceiling of F/T divided by $k_{max}$, wherein $k_{max}$ (indicated at 806 in FIG. 8) represents a number of symbols in each source block, T (indicated at 804 in FIG. 8) is a number of bytes in each symbol, and F (indicated at 802 in FIG. 8) is a size of the file.

In one non-limiting example, between five and twenty five percent of the number of symbols in a source block may be repair symbols. In a particularly specific embodiment, ten percent of the number of symbols in a source block may be repair symbols.

FIG. 9 picks up additional disclosure. As shown in FIG. 9, at least some partitions 900 include $Z_l$ source blocks (indicated at 902 in FIG. 9), wherein $Z_l$ equals the ceiling of Z divided by $P_n$ (indicated at 904 in FIG. 9), wherein $P_n$ is the total number of partitions in the file. On the other hand, at least one partition (indicated at 906 in FIG. 9) includes $Z_s$ source blocks, wherein $Z_s$ equals a floor of Z divided by $P_n$. Thus, some partitions will have different numbers of source blocks than other partitions.

Figure 10:
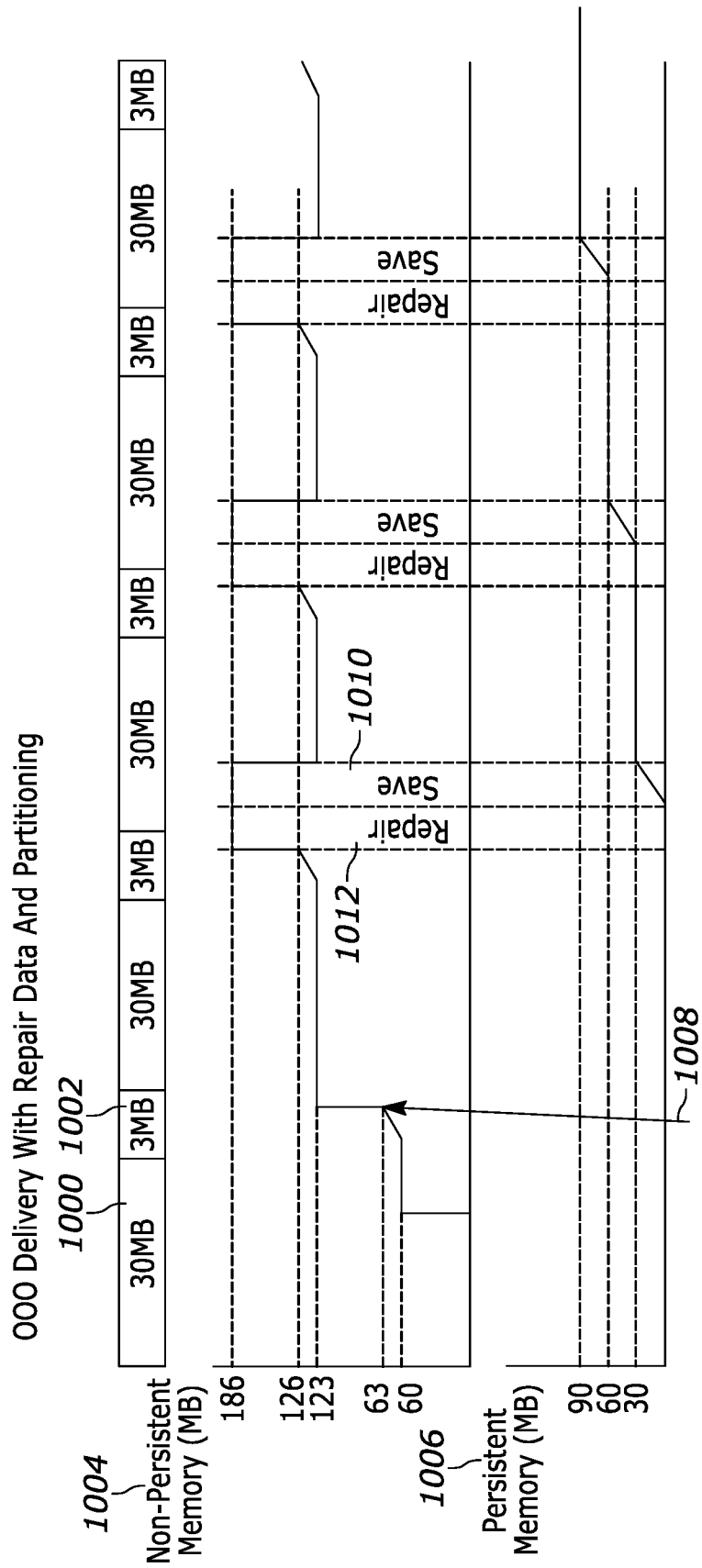
FIG. 10 illustrates OOO delivery with repair data and partitioning.

Now referring to FIG. 10, the top bar represents data symbols 1000 of source blocks interleaved with repair symbols 1002. Both non-persistent memory 1004 and persistent memory 1006 are represented in FIG. 10. As indicated at 1008 in FIG. 10, for devices with fast block read from persistent flash, incomplete data, or data without sufficient repair data, may be saved 1010 to FLASH (persistent memory example), along with repair 1012 and/or a record of the gaps in the data. This incomplete data can be retrieved next time around the carousel when the partition appears. This maximizes the chance that the partition will complete. In this instance, this incomplete partition can be removed from non-persistent memory.

ATSC 3.0 signaling such as in an extension to a file deliver table (FDT) instance may include the following element to support present techniques. The signaling enables a receiver to assess if it has the memory capability in RAM to receive a large file that is delivered OOO, but that is also partitioned. Additional signaling to indicate the percentage of repair data is included also to complete this memory requirement assessment.

@maxCacheMemory—When FDT-Instance order attribute is false, this optional 32-bit unsigned integer attribute represents the maximum memory required at any time to keep the received file data in cache. This allows the receiver to assess its capability to receive the data in non-persistent storage prior to block transfer of a completed block of contiguous data to persistent storage or for the receiver to repair a block of data in the case when repairFlow is utilized.

When not present the FDT-Instance.maxTransportSize, the LCT Header Transfer Length or the Entity Mode Content-Length should be used by the receiver. If FDT-Instance order attribute is true, data is not sent out of order.

It will be appreciated that whilst present principals have been described with reference to some example embodiments, these are not intended to be limiting, and that various alternative arrangements may be used to implement the subject matter claimed herein.

What is claimed is:

1. A method, comprising:
dividing at least one file into plural partitions;
within each partition, arranging packets of the partition out of order (OOO), the packets of the partition being arranged OOO relative to the packets being in order as defined by the at least one file; and
sending the partitions in order with their respective packets OOO to at least one receiver, the partitions being in order as defined by the at least one file.

2. The method of claim 1, comprising:
interleaving plural source blocks of the file with repair symbols, each partition comprising plural source blocks.

3. The method of claim 2, wherein the file comprises Z source blocks, wherein Z is greater than or equal to a ceiling of F/T divided by $k_{max}$, wherein $k_{max}$ represents a number of symbols in each source block, T is a number of bytes in each symbol, F is a size of the file, and ceiling represents rounding up to the nearest integer.

4. The method of claim 3, wherein at least some partitions comprise $Z_l$ source blocks, wherein $Z_l$ equals the ceiling of Z divided by $P_n$, wherein $P_n$ comprises a total number of partitions.

5. The method of claim 4, wherein at least one partition comprises $Z_s$ source blocks, wherein $Z_s$ equals a floor of Z divided by $P_n$, wherein floor represents rounding down to the nearest integer.

6. The method claim 1, wherein the method is implemented in an advanced television systems committee (ATSC) 3.0 system.

7. A digital television apparatus, comprising:
at least one receiver configured to receive digital television signals from a digital television transmitter system, the receiver comprising at least one processor programmed with instructions for:
receiving, into non-persistent memory, at least some partitions of plural partitions of at least one file, each partition of the at least some partitions comprising packets out of order (OOO), the packets being OOO relative to the packets being in correct order as defined by the at least one file;
ordering the packets from OOO into the correct order;
sending at least one partition in non-persistent memory to persistent memory; and
receiving into the non-persistent memory additional partitions.

8. The digital television apparatus of claim 7, wherein the digital television apparatus comprises an advanced television systems committee (ATSC) 3.0 receiver.

9. The digital television apparatus of claim 7, wherein plural source blocks of the file are interleaved with repair symbols, each partition of the at least some partitions comprising plural source blocks.

10. The digital television apparatus of claim 9, wherein the file comprises Z source blocks, wherein Z is greater than or equal to a ceiling of F/T divided by $k_{max}$, wherein $k_{max}$ represents a number of symbols in each source block, T is a number of bytes in each symbol, and F is a size of the file.

11. The digital television apparatus of claim 10, wherein at least some partitions comprise $Z_l$ source blocks, wherein $Z_l$ equals the ceiling of Z divided by $P_n$, wherein $P_n$ comprises a total number of partitions.

12. The digital television apparatus of claim 11, wherein at least one partition comprises $Z_s$ source blocks, wherein $Z_s$ equals a floor of Z divided by $P_n$.

13. The digital television apparatus of claim 7, wherein the instructions are executable for:
correcting errors in one or more of the packets while the packets are in non-persistent memory.

14. The digital television apparatus of claim 7, wherein the instructions are executable for:
correcting errors in one or more of the packets while the packets are in persistent memory.

15. The digital television apparatus of claim 7, wherein the instructions are executable for displaying the file.

16. A digital television apparatus, comprising:
at least one transmitter comprising at least one processor programmed with instructions to configure the processor for:
dividing at least one file into plural partitions;
within each partition, arranging packets of the partition out of order (OOO), the packets of the partition being arranged OOO relative to the packets being in order as defined by the at least one file; and
sending the partitions in order with their respective packets OOO to at least one receiver, the partitions being in order as defined by the at least one file.

17. The digital television apparatus of claim 16, wherein the instructions are executable for:
interleaving plural source blocks of the file with repair symbols, each partition comprising plural source blocks.

18. The digital television apparatus of claim 17, wherein the file comprises Z source blocks, wherein Z is greater than or equal to a ceiling of F/T divided by $k_{max}$, wherein $k_{max}$ represents a number of symbols in each source block, T is a number of bytes in each symbol, and F is a size of the file.

19. The digital television apparatus of claim 18, wherein at least some partitions comprise $Z_l$ source blocks, wherein $Z_l$ equals the ceiling of Z divided by $P_n$, wherein $P_n$ comprises a total number of partitions.

20. The digital television apparatus of claim 19, wherein at least one partition comprises $Z_s$ source blocks, wherein $Z_s$ equals a floor of Z divided by $P_n$.

* * * * *